(12) United States Patent
Menard et al.

(10) Patent No.: US 8,520,587 B2
(45) Date of Patent: Aug. 27, 2013

(54) WIRELESS DATA ACQUISITION NETWORK

(75) Inventors: Jean-Paul Menard, Thouare sur Loire (FR); Jacques Hamon, Nantes (FR); Pierre Sagot, Saint Luce sur Loire (FR)

(73) Assignee: Sercel, Carquefou (FR)

( * ) Notice: Subject to any disclaimer, the term of this patent is extended or adjusted under 35 U.S.C. 154(b) by 429 days.

(21) Appl. No.: 11/268,739

(22) Filed: Nov. 8, 2005

(65) Prior Publication Data

US 2007/0025308 A1 Feb. 1, 2007

(30) Foreign Application Priority Data

Jul. 28, 2005 (FR) ...................................... 05 08068

(51) Int. Cl.
*H04W 4/00* (2009.01)
(52) U.S. Cl.
USPC ................. 370/328; 367/14; 367/77; 702/14; 702/79; 340/870.13
(58) Field of Classification Search
USPC .......................................................... 370/328
See application file for complete search history.

(56) References Cited

U.S. PATENT DOCUMENTS

| | | | |
|---|---|---|---|
| 6,226,601 B1 * | 5/2001 | Longaker ......................... 702/79 |
| 7,020,501 B1 * | 3/2006 | Elliott et al. .................... 455/574 |
| 7,035,240 B1 * | 4/2006 | Balakrishnan et al. ....... 370/338 |
| 7,277,414 B2 * | 10/2007 | Younis et al. .................. 370/338 |
| 7,436,789 B2 * | 10/2008 | Caliskan et al. ............ 370/310.1 |
| 2001/0039478 A1 * | 11/2001 | Bary et al. ....................... 702/14 |
| 2002/0053974 A1 * | 5/2002 | Beken ............................. 340/539 |
| 2003/0012168 A1 * | 1/2003 | Elson et al. .................... 370/338 |
| 2003/0152041 A1 * | 8/2003 | Herrmann et al. ............ 370/310 |
| 2003/0201909 A1 * | 10/2003 | Hilliard .......................... 340/940 |
| 2004/0037165 A1 | 2/2004 | Lemenager et al. |
| 2004/0090345 A1 * | 5/2004 | Hitt .......................... 340/870.11 |
| 2004/0121786 A1 | 6/2004 | Radcliffe et al. |
| 2004/0169516 A1 * | 9/2004 | Kraz ............................... 324/457 |
| 2005/0078672 A1 * | 4/2005 | Caliskan et al. ............... 370/389 |
| 2005/0114033 A1 * | 5/2005 | Ray et al. ......................... 702/14 |
| 2005/0122231 A1 * | 6/2005 | Varaiya et al. ........... 340/870.01 |
| 2007/0071114 A1 * | 3/2007 | Sanderford et al. .......... 375/259 |

* cited by examiner

*Primary Examiner* — German Viana Di Prisco
(74) *Attorney, Agent, or Firm* — Fulbright & Jaworski L.L.P.

(57) ABSTRACT

The invention relates to a device, a method and an apparatus for acquiring data, the device comprising a wireless network including a set of nodes (100), each node (100) including a sender (140) and a receiver (150) for sending and/or receiving and/or relaying data and/or commands, and a satellite positioning system (130), characterized in that each satellite positioning system (130) includes means for providing specific data used for time-stamping the data relative to a common time reference, organizing an access to the wireless network in a perfectly controlled manner, and routing data and/or commands within the network.

13 Claims, 2 Drawing Sheets

WIRELESS DATA ACQUISITION NETWORK

The invention relates to a wireless data acquisition network.

The invention relates in particular to a wireless network of seismic sensors.

More specifically, the present invention relates to a network of seismic sensors equipped with a satellite positioning system.

The present invention applies in particular to the field of oil exploration. In this field of application, seismic sensors, disposed on the surface of the Earth, are used to receive the echoes of waves emitted by seismic sources (vibrators or explosives). These echoes are processed to construct a map of the explored subsurface, indicating the topology of the latter.

The invention is not, however, limited to the particular field of oil exploration, and can be applied to any field implementing a wireless data acquisition network.

A person skilled in the art will be familiar with many devices implementing a data acquisition network.

In the case where the data acquisition network is formed by a set of seismic sensors, these devices are conventionally and generally, formed of sensors interlinked in groups by means of wires or cables to a "node" of the network. These nodes are normally organized in groups around a "concentrator"; a group of nodes forms, with its concentrator, a subnetwork, the links between the concentrator and the nodes also being wired. The concentrators locally manage the subnetwork of nodes, provide the power feed for the nodes and centralize the data. The concentrators are connected to a local data network, also wired, to which is connected a central processing unit which drives the whole device and stores the data from the subnetworks.

These conventional solutions are well known to those skilled in the art and will not be described in detail below. It should, however, be remembered that these solutions require large quantities and long lengths of cables, cables that are difficult to move and to set up on an operating site. Wireless data acquisition networks have therefore been proposed, presenting many advantages. They do, however, present drawbacks, as for example in US document 2004/0121786.

In practice, because each node of the network has no link based on a physical bearer with the other nodes of the network, the nodes cannot receive power feed via wires or cables. The power feed for each of the nodes must therefore be provided by means of a battery with sufficient autonomy.

Furthermore, specific means must be provided for the time reference at each node of the network to be able to be known by each of the nodes and also to be able to be synchronized between the nodes to obtain acquisition data with good time accuracy, this too, obviously, no longer being performed via wires or cables linking the nodes.

US document 2004/0121786 discloses a device comprising a wireless data communication and acquisition network, particularly applicable to a network of seismic sensors.

In this document, and to expend a minimum of energy, the data acquired at a node of the network is transmitted to an adjacent node and so on and so forth until the data reach its destination. This data transmission technique is called multi-hop and is employed because the energy needed to transmit the data from any node of the network to a recipient not located in the vicinity of said node is less than the energy that would be needed to transmit the data from any node of the network direct to this recipient. In the case of a network of seismic sensors, the recipient is a concentrator. In this document, the time reference is, furthermore, known to each of the nodes by means of a GPS system installed in each of these nodes.

In a wireless data acquisition network using this multi-hop technique, it is also essential to provide a way of transmitting the data between the different nodes of the network. US document 2004/0121786 provides for a routing, from a node hosting data to the recipient of this data, which is random and self-organized.

In this type of routing, the nodes of the network, sending their own data and relaying that of others, are often subject to congestion. In practise, the network includes a relatively small number of nodes for which the equiprobability of the distribution of the data to be routed between nodes is not optimized. Furthermore, in the case of a seismic application, since the recipient of the data acquired at the nodes is the concentrator, the nodes located in the vicinity of this concentrator are particularly subject to congestion.

To overcome this congestion problem affecting certain nodes, the US document 2004/0121786 discloses a weighting of the paths, that is, the application of different probabilities between the different possible paths, in order to prevent congested nodes from receiving more data.

However, this is proving clearly inadequate, in particular in the case of a seismic application and for the nodes located in the vicinity of the concentrator, which has the effects of lengthening certain paths between a node hosting data and the recipient of this data, increasing the data processing time accordingly.

The wireless data acquisition networks must therefore be enhanced, particularly in the context of application to a network of seismic sensors.

This object is achieved within the context of the present invention through a data acquisition device formed of a wireless network including a set of nodes, each node including a sender and a receiver for sending and/or receiving and/or relaying data and/or commands, and a satellite positioning system, characterized in that each satellite positioning system includes means for providing specific data used for:
- time-stamping the data relative to a common time reference,
- organizing an access to the wireless network in a perfectly controlled manner, and
- routing the data and/or commands within the network.

This object is also achieved in the context of the present invention through a method of acquiring data within a wireless network including a set of nodes, said method including steps consisting in:
- sending and/or receiving and/or relaying data and/or commands from at least one node of the network, said node including a sender and a receiver;
- providing specific data from a satellite positioning system located in each node of the network;
- time-stamping the data relative to a common time reference,
- organizing an access to the wireless network in a perfectly controlled manner, and
- routing the data and/or commands sent and/or received and/or relayed within the network.

Other characteristics, objects and advantages of the present invention will become apparent from reading the detailed description that follows, and in light of the appended drawings, given by way of non-limiting examples, and in which:

FIG. 1 shows a apparatus used in the context of the present invention. Installed within the device according to the present invention, this apparatus forms a node of a wireless network.

Figure 1:
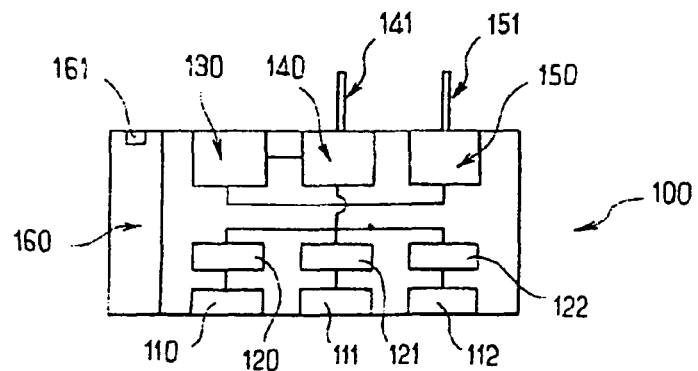
FIG. 1 represents an apparatus used in the device according to the present invention.

The apparatus 100 includes at least one signal sensor 110, 111, 112. Each sensor 110, 111, 112 implemented is linked to an analog-digital converter, that is, respectively 120, 121 and 122, the function of which is to convert the echoes sensed by said at least one sensor 110, 111, 112 in the form of digital data. Means associated with the analog-digital converter are provided to link time-stamp information with said digital data generated in the analog-digital converter. In the case of a seismic application, the apparatus 100 is placed on or driven into the ground, and the function of the seismic sensor 110, 111, 112 is to capture the echoes of these waves emitted by the seismic sources.

The apparatus 100 also includes a satellite positioning system (or SPS) 130 in order to provide the position of the sensor relative to a local geographic reference. Typically, for seismic applications, a relative accuracy of around 1 meter is sufficient. This satellite positioning system also provides the global time. Typically, for the seismic applications, an accuracy of around 1 microsecond is sufficient.

The apparatus 100 further includes a sender 140 and a receiver 150 of radio waves for, on the one hand, sending the data acquired by a seismic sensor 110, 111, 112 and, on the other hand, receiving and/or relaying the data acquired by any sensor of the network located in another apparatus like the apparatus 100. The sender 140 and the receiver 150 respectively include an antenna 141 and an antenna 151.

The apparatus 100 also includes a means (not shown) of storing the data acquired by a sensor 110, 111, 112 or acquired by a sensor located in another data acquisition apparatus, that is, another node of the network, a controller (not shown) for controlling the correct operation of the various subapparatuses 110, 120, 130, 140, 150, of the storage means, and for managing in particular the interchange of information between these various subapparatuses.

The set of means included in the apparatus 100 is powered with an independent battery via a connection system not shown. An appropriate means 161 is provided for the battery 160 to be rechargeable.

In practise, the use of a rechargeable battery is necessary because of the consumption of the various subapparatuses of the apparatus 100, and in particular of the satellite positioning system. Furthermore, in the case of seismic data acquisition, the trend of the effects is relatively fast and therefore entails taking relatively frequent measurements in order to follow the trend of these effects. Therefore, it is necessary to provide power feed fairly frequently to the various subapparatuses, which limits the autonomy of the battery accordingly. Now, in operation, the autonomy of a battery needs to be at least one month, which is not the case today.

Seismic data acquisition is based on a statistical method, that is, the sensor must receive a multitude of times a wave emitted by a seismic source located in a given location such that the successive tests are repeatable and can therefore be used to obtain a clear image of the subsurface strata. Since the method is based on a measurement of the propagation time of a seismic wave between a seismic source and the sensor 110, 111, 112, and therefore of the apparatus 100, it is essential to have a good time accuracy for the measurements. To this end, the satellite positioning system installed in each node provides a time reference common to all the nodes of the network with which it is possible to time-stamp accurately the acquisition of the seismic data. Typically, the time specification for a test is around 10 μs and an accuracy of around 1 meter on the position of the source and of the sensor is sufficient.

Figure 2:
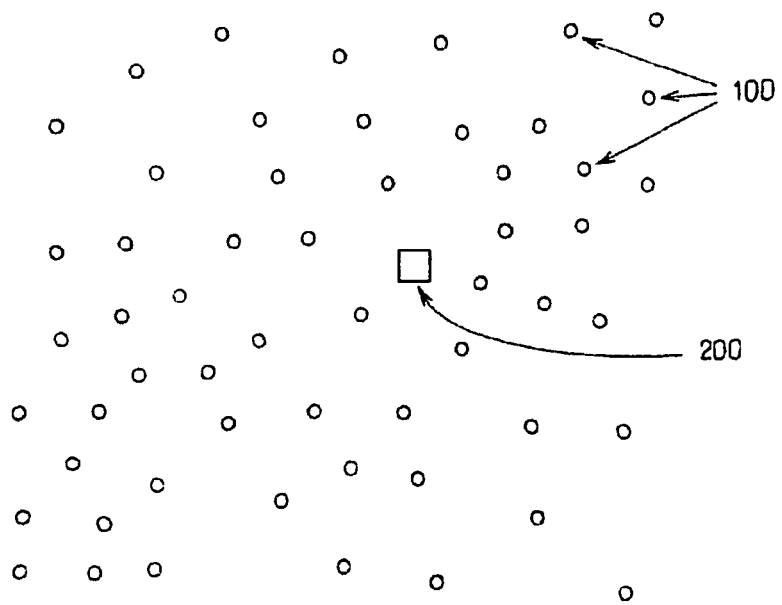
FIG. 2 represents a wireless network comprising a set of nodes in accordance with the present invention.

FIG. 2 shows a wireless data acquisition network including a set of nodes, each node being an apparatus 100 as represented in FIG. 1.

In the case of an application in the seismic domain, the network also includes a concentrator 200, the function of which is to centralize all the data emitted and/or received and/or relayed by the nodes and organize the network by means of commands that it sends to the nodes of the network. The sender 140 and the receiver 150 are therefore also used to pass the commands from the concentrator 200 to the nodes 100.

Where appropriate, this concentrator 200 can also serve as a local geographic reference for all the nodes of the network. In all cases, the position of the concentrator 200 must be known accurately, for example by means of a satellite positioning system included in the concentrator 200.

The mode of transmission of the data and/or the commands between the various nodes of the network is organized in a controlled manner, by the concentrator 200. For this, the concentrator 200 uses specific data provided by the satellite positioning systems 130 of each node.

More specifically, since the satellite positioning system 130 of a node of the network includes means for knowing the position of the nodes 100 and of the concentrator 200 within the network relative to a local reference, and means for ascertaining the global time, this global time also being known to the concentrator 200, the concentrator 200 knows the position of the nodes (direction, distance) relative to it and, in conjunction with the common time reference, knows at each instant, the nodes in which there are commands and/or data and in what quantities.

Because of this, the concentrator 200 is able to organize in a controlled manner the access to the wireless network, the routing of the data and/or of the commands, and the time-oriented sequencing of the operation of the sender 140 and of the receiver 150 of each node 100. For this, each node 100 of the network is allocated time slots in which it must send, time slots in which it must retain in the storage means of the node the commands and/or the data acquired by a sensor 110, 111, 112 and originating from an analog-digital converter 120, 121, 122 or data originating from other nodes, and finally time slots in which it must receive the commands and/or the data originating from one or more other nodes.

By this data transmission mode organized in a controlled manner, the congestion of the nodes is minimized and the processing time of the data from its detection on a sensor through to its arrival at the recipient is also minimized. Consequently, the actual overall throughput of the device is optimized.

Furthermore, the time slots during which a node does not send or transmit are exploited to switch the node to standby mode. Thus, in this time slot, the battery consumes a negligible quantity, so increasing its autonomy. It will be understood that this advantage is directly linked to the invention because a random and self-organized transmission mode, as disclosed in the prior art, requires all the nodes of the network to be angle to send and/or receive and/or relay data and/or commands at each instant.

As specified above, the time slots during which the node is switched to standby mode are time slots in which commands and/or data are stored in the storage means of a node. This storage means is preferably a cyclic buffer memory, which can of course be used to store data and/or commands, but which can also be used, by means of the global time provided by the satellite positioning system 130 of a node 100, to time-stamp the data and/or the commands. This memory makes it possible to backtrack in time to a point in time that depends on the depth of memory. This memory can provide the sender with data pre-stored between two predefined dates.

The transmission mode of the present invention can also be used to organize in a controlled way the radiofrequencies used in a data hop between two nodes.

Figure 3:
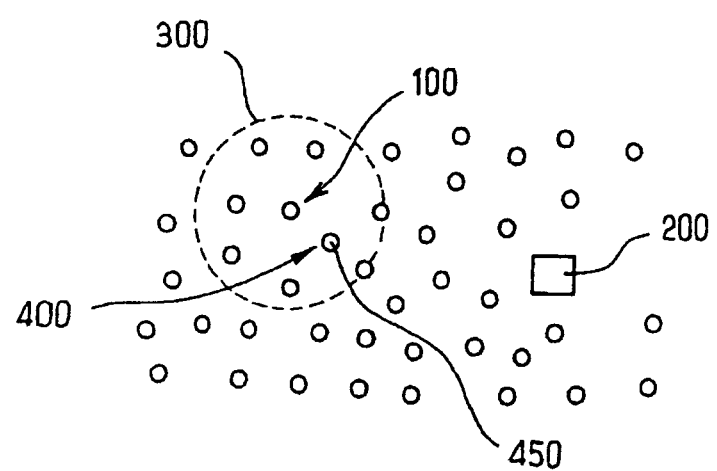
FIG. 3 represents a wireless network like that of FIG. 2 in an operating phase.

FIG. 3 shows a wireless data acquisition network like that of FIG. 2, and in which the circle 300 represents the range of a wave emitted by a node 100 of the network and transmitting commands and/or data acquired at the node 100 and/or relayed by this node 100. This wave 300 can reach a multitude of receivers located in other nodes of the network, but, it is useful to communicate this data only to one of them, to steer the data by stages to the final recipient.

For this, the concentrator 200 that organizes the network therefore controls the frequency of the wave emitted by the node 100 and specifies to the receiver 450 of the node 400 this radiofrequency for receiving the data. At the same time, the concentrator 200 checks that all the other nodes located in range of the wave emitted by the node 100 are totally transparent to this radiofrequency. This is possible because the positions of the nodes relative to each other and the position of the concentrator 200 are absolutely known. The space-time management of the data transmission prevents any data collision between the various nodes.

The present invention is not limited to the embodiment described above. In particular, an apparatus 100 including only one antenna 141 or 151 common to the server 140 and the receiver 150 can be considered, the apparatus then including a switch.

The local geographic reference used to position the various nodes of the network can be the concentrator, in particular for seismic applications, but separate instrumentation may be employed to this end.

The satellite positioning system implemented in a apparatus 100 may be the GPS system but any other equivalent means can also be considered.

The present invention is not limited to applications in the seismic domain in which a concentrator organizes and centralizes the data, but can be extended to any variant similar in spirit. In particular, a network of nodes interchanging data and in which the data recipient is another node of the network is in accordance with the present invention, the controlled organization of the transmission of the data disclosed above being handled by the nodes themselves.

Finally, a wireless network of nodes according to the present invention is not limited to a data acquisition system but can be extended to any communication system.

The invention claimed is:

1. A seismic data acquisition device for oil exploration on ground comprising a wireless network including:
    a set of nodes having each a first satellite positioning system for determining a first position of each node and at least one seismic sensor for acquiring seismic sensor data, the seismic sensors being disposed on or into the ground to capture echoes of waves emitted by seismic sources to construct a map of a subsurface of the ground,
    a concentrator to centralize said seismic sensor data, the concentrator being distinct from the nodes and having a second satellite positioning system for determining a second position of the concentrator, the concentrator is configured to calculate, based on the first positions of the first satellite positioning systems of the nodes and on the second position of the second satellite positioning system of the concentrator, the distance of each node relative to the concentrator and the direction of each node relative to the concentrator,
    wherein the first satellite positioning systems of the nodes and the second satellite positioning system of the concentrator bring a common time reference to the concentrator and to the nodes, and each node has means for time-stamping its seismic sensor data relative to the common time reference,
    the concentrator is also configured to send wirelessly commands for nodes of the network and configured to receive wirelessly said seismic sensor data,
    wherein each node has a sender and a receiver configured to receive wirelessly and pass wirelessly the commands to another node and configured to receive wirelessly said seismic sensor data from another node, send wirelessly and relay wirelessly said seismic sensor data to another node,
    wherein the concentrator is configured to control, based on said calculated distance relative to the concentrator, on said calculated direction of each node relative to the concentrator and on said common time reference, the routing of the commands from the concentrator to a node of the network through at least one other node of the network in allocated time slots, and is configured to control, based on said calculated distance relative to the concentrator, on said calculated direction of each node relative to the concentrator and on said common time reference, the routing of seismic sensor data from a node of the network through at least one other node of the network to the concentrator in allocated time slots,
    wherein the concentrator is configured to serve as a local geographic reference for the set of nodes,
    wherein the concentrator is configured to allocate, based on said calculated distance relative to the concentrator, on said calculated direction of each node relative to the concentrator and on said common time reference, to each node:
        said time slots during which the receiver of the node must receive the seismic sensor data originating from one or more other nodes of the network and the commands coming from the concentrator or one or more other nodes of the network,
        said time slots during which the node is switched to a standby mode, in which the sender of the node does not send, in which the receiver of the node does not receive and in which a memory of the node stores the commands received wirelessly from the concentrator or one or more other nodes of the network and the seismic sensor data received wirelessly from one or more other nodes of the network,
        said time slots during which the sender of the node must send the seismic sensor data and the commands to one or more other nodes of the network.

2. The device according to claim 1, wherein each node is configured to time stamp the commands it has received relative to the common time reference.

3. The device according to claim 1, wherein each satellite positioning system is configured to provide specific data used to organize in a controlled manner the allocation of a specific radiofrequency between a sender and a receiver, respectively located in separate nodes of the network.

4. The device according to claim 1, wherein the concentrator organizes, in a controlled way and on the basis of specific data provided by the satellite positioning system, the access to the wireless network, the routing within the network of the data and commands that it generates, the time-oriented sequencing of the operation of the sender and of the receiver with each of the nodes, and the allocation of a specific radiofrequency between a sender and a receiver respectively located in separate nodes of the network.

5. The device according to claim 1, wherein each node includes at least one analog digital converter for converting the seismic data from said at least one seismic sensor and means associated with the analog-digital converter for linking time-stamping information with said seismic data.

6. The device according to claim 1, wherein each node includes means for linking time-stamping information with the seismic sensor data of the sensor of said node, wherein the memory stores the time-stamping information with the seismic sensor data of said node.

7. The device according to claim 1, wherein each node includes at least one analog digital converter for converting the seismic data from said at least one seismic sensor, the memory stores the specific data provided by the satellite positioning system, the data from said at least one analog-digital converter of a node, the data and/or commands from one or more other nodes of the network.

8. The device according to claim 1, wherein the concentrator controls the frequency emitted by a transmitting node and to notify a receiving node of said frequency.

9. A method of acquiring seismic data for oil exploration on ground within a wireless network, wherein the wireless network includes:
   a set of nodes having each a first satellite positioning system for determining a first position of each node and at least one seismic sensor for acquiring seismic sensor data, the seismic sensors being disposed on or into the ground to capture echoes of waves emitted by seismic sources to construct a map of a subsurface of the ground,
   a concentrator centralizing said seismic sensor data, the concentrator being distinct from the nodes and having a satellite positioning system for determining a second position of the concentrator, and the concentrator serving as a local geographic reference for the set of nodes, said method comprising steps of:
   bringing by the first satellite positioning systems of the nodes and the second satellite positioning system of the concentrator a common time reference to the concentrator and to the nodes,
   time-stamping in each node the seismic sensor data relative to the common time reference,
   determining in the concentrator, based on the first positions of the first satellite positioning systems of the nodes and on the second position of the second satellite positioning system of the concentrator, the distance of each node relative to the concentrator and the direction of each node relative to the concentrator,
   sending wirelessly commands for nodes of the network by the concentrator,
   receiving wirelessly and passing wirelessly the commands from the concentrator or at least one node of the network to another node of the network, said node including a sender and a receiver to receive wirelessly and send wirelessly the commands to another node and to receive wirelessly said seismic sensor data from another node, send wirelessly and relay wirelessly said seismic sensor data to another node;
   controlling by the concentrator, based on said determined distance relative to the concentrator, on the determined direction of each node distance relative to the concentrator and on said common time reference, the routing of the commands from the concentrator to a node of the network through at least one other node of the network in allocated time slots, controlling by the concentrator, based on said determined distance relative to the concentrator, on the determined direction of each node relative to the concentrator and on said common time reference, the routing of the seismic sensor data from a node of the network through at least one other node of the network to the concentrator in allocated time slots,
   allocating by the concentrator, based on said determined distance relative to the concentrator, on the determined direction of each node relative to the concentrator and on said common time reference, to each node:
      said time slots during which the receiver of the node must receive the seismic sensor data originating from one or more other nodes of the network and the commands coming from the concentrator or one or more other nodes of the network,
      said time slots during which the node is switched to a standby mode, in which the sender of the node does not send, in which the receiver of the node does not receive and in which a memory of the node stores the commands received wirelessly from the concentrator or one or more other nodes of the network and the seismic sensor data of the sensor of the node and the seismic sensor data received wirelessly from one or more other nodes of the network, and
      said time slots during which the sender of the node must send the seismic sensor data and the commands to one or more other nodes of the network.

10. The method according to claim 9, further comprising the step of time-stamping in each node the commands it has received relative to the common time reference.

11. The method according to claim 9, further comprising the step of organizing in a controlled manner the allocation of a specific radiofrequency between a sender and a receiver, respectively located in separate nodes of the network.

12. The method according to claim 9, further comprising the step of linking the stamping information with the seismic sensor data of the sensor of each node and storing the time-stamping information with the sensor data of said node in the memory of the node.

13. The method according to claim 9, further comprising:
   controlling, by the concentrator, the frequency emitted by a transmitting node; and notifying by the concentrator, a receiving node of said frequency.

* * * * *